(12) United States Patent
Walles et al.

(10) Patent No.: US 11,513,254 B2
(45) Date of Patent: Nov. 29, 2022

(54) ESTIMATION OF FRACTURE PROPERTIES BASED ON BOREHOLE FLUID DATA, ACOUSTIC SHEAR WAVE IMAGING AND WELL BORE IMAGING

(71) Applicant: Baker Hughes Oilfield Operations LLC, Houston, TX (US)

(72) Inventors: Frank Walles, The Woodlands, TX (US); Stephen Dymmock, Spring, TX (US); Alex Bruns, Houston, TX (US); Umesh Prasad, Spring, TX (US); Sergey Kotov, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 833 days.

(21) Appl. No.: 16/245,072

(22) Filed: Jan. 10, 2019

(65) Prior Publication Data
US 2020/0225381 A1 Jul. 16, 2020

(51) Int. Cl.
*G01V 11/00* (2006.01)
*G01V 1/50* (2006.01)
(Continued)

(52) U.S. Cl.
CPC .......... *G01V 11/00* (2013.01); *E21B 41/0092* (2013.01); *E21B 47/002* (2020.05);
(Continued)

(58) Field of Classification Search
CPC .... G01V 11/00; G01V 1/50; G01V 2210/646; G01V 1/284; G01V 2200/16;
(Continued)

(56) References Cited

U.S. PATENT DOCUMENTS 3,764,968 A 10/1973 Anderson
3,958,217 A 5/1976 Spinnler
(Continued)

FOREIGN PATENT DOCUMENTS

WO 2017039605 A1 3/2017

OTHER PUBLICATIONS

Junjie Yang et al., "An Integrated Analytics Platform for Completion Optimization and Reservoir Characterization," SPE-191459-18IHFT-MS, pp. 1-13 (Year: 2018).*
(Continued)

*Primary Examiner* — Steven W Crabb
(74) *Attorney, Agent, or Firm* — Cantor Colburn LLP

(57) ABSTRACT

Methods, systems, devices, and products for well logging. Methods include conveying a logging tool in the borehole on a carrier; obtaining a borehole image over at least one interval of borehole depth from well logging measurements with a downhole imaging instrument; obtaining acoustic information representative of acoustic reflections from a far-field region of the formation; obtaining quantitative borehole fluid information indicative of properties of a formation fluid in a near-field region of the borehole; generating a borehole connectivity fracture model of the formation in dependence upon the borehole image, the quantitative borehole fluid information, and the acoustic information. Methods may include identifying near-field fractures from the borehole image, and/or identifying far-field fractures from the acoustic information. Methods may include generating a fracture interpretation correlating the near-field fractures with the far-field fractures, and generating the borehole connectivity fracture model of the formation in dependence upon the fracture interpretation.

17 Claims, 8 Drawing Sheets

(51) Int. Cl.
  *E21B 49/08* (2006.01)
  *E21B 41/00* (2006.01)
  *E21B 49/00* (2006.01)
  *E21B 47/002* (2012.01)

(52) U.S. Cl.
  CPC .............. *E21B 49/00* (2013.01); *E21B 49/08* (2013.01); *G01V 1/50* (2013.01); *G01V 2210/646* (2013.01)

(58) Field of Classification Search
  CPC ..... G01V 2210/121; G01V 2210/1299; G01V 2210/1429; E21B 47/002; E21B 49/08; E21B 41/0092; E21B 49/00; E21B 2200/20; E21B 43/26
  See application file for complete search history.

(56) References Cited

U.S. PATENT DOCUMENTS

| | | | |
|---|---|---|---|
| 4,351,037 | A | 9/1982 | Scherbatskoy |
| 4,649,525 | A | 3/1987 | Angona et al. |
| 4,833,915 | A | 5/1989 | Radd et al. |
| 4,887,464 | A | 12/1989 | Tannenbaum et al. |
| 4,953,595 | A | 9/1990 | Kotlyar |
| 6,044,327 | A | 3/2000 | Goldman |
| 6,176,344 | B1 | 1/2001 | Lester |
| 6,603,313 | B1 | 8/2003 | Srnka |
| 6,898,150 | B2 | 5/2005 | Hahn et al. |
| 6,977,499 | B2 | 12/2005 | Kiesl et al. |
| 6,999,055 | B2 | 2/2006 | Uamashita et al. |
| 7,035,165 | B2 | 4/2006 | Tang |
| 7,219,541 | B2 | 5/2007 | Difoggio |
| 7,389,185 | B2 | 6/2008 | Craig |
| 7,417,920 | B2 | 8/2008 | Hahn et al. |
| 7,472,748 | B2 | 1/2009 | Gdanski et al. |
| 7,810,569 | B2 | 10/2010 | Hill et al. |
| 7,869,955 | B2 | 1/2011 | Zhang et al. |
| 8,055,448 | B2 | 11/2011 | Mathiszik et al. |
| 8,060,309 | B2 | 11/2011 | Xue et al. |
| 8,386,226 | B2 | 2/2013 | Craig |
| 8,392,165 | B2 | 3/2013 | Craig et al. |
| 8,437,961 | B2 | 5/2013 | Srnka et al. |
| 8,811,114 | B2 | 8/2014 | Geerits et al. |
| 9,416,644 | B2 | 8/2016 | McEwen-King et al. |
| 9,580,967 | B2 | 2/2017 | Galey et al. |
| 9,617,851 | B2 | 4/2017 | Dahl et al. |
| 9,920,607 | B2 | 3/2018 | Brannon et al. |
| 2006/0272812 | A1 | 12/2006 | Yu et al. |
| 2007/0272407 | A1 | 11/2007 | Lehman et al. |
| 2008/0151690 | A1 | 6/2008 | Tang et al. |
| 2014/0078288 | A1 | 3/2014 | Wu |
| 2015/0013974 | A1 | 1/2015 | Mekic et al. |
| 2015/0109886 | A1 | 4/2015 | Mekic et al. |
| 2015/0136962 | A1* | 5/2015 | Pomerantz .............. E21B 47/10 250/255 |
| 2015/0159477 | A1 | 6/2015 | Lecerf et al. |
| 2016/0030521 | A1 | 2/2016 | Chilkoti et al. |
| 2016/0115786 | A1 | 4/2016 | Breviere et al. |
| 2016/0363684 | A1 | 12/2016 | Patterson et al. |
| 2017/0023691 | A1 | 1/2017 | Donald et al. |
| 2017/0075004 | A1 | 3/2017 | McColpin et al. |
| 2017/0115420 | A1 | 4/2017 | Cazeneuve et al. |
| 2017/0205531 | A1* | 7/2017 | Berard ...................... E21B 7/04 |
| 2017/0247995 | A1 | 8/2017 | Crews et al. |
| 2017/0260855 | A1 | 9/2017 | Yang et al. |
| 2018/0202263 | A1 | 7/2018 | Prasad et al. |
| 2018/0291734 | A1 | 10/2018 | Ritzmann et al. |

OTHER PUBLICATIONS

Pixler, B.D., "Formation Evaluation By Analysis of Hydrocarbon Ratios," Jnl Petrol. Tech., pp. 665-670 (Jun. 1969).
Zoback, P., M.D., "Compressive & Tensile Failure of Inclined Wellbores & Determination of In-Situ Stress and Rock Strength," Jnl Geophys. Res.—Solid Earth 100: 12791-81 (1995).
Barree, R.D., "A Practical Guide to Hydraulic Fracture Diagnostic Technologies," SPE Annual Tech. Conf. (Sep. 2002).
IPRP in PCT/US2020/013186 dtd Jun. 16, 2021.
Gulf Cooperation Examination Report for Application No. GC 2020-038997; dated Oct. 21, 2021; 3 pages.

* cited by examiner

ESTIMATION OF FRACTURE PROPERTIES BASED ON BOREHOLE FLUID DATA, ACOUSTIC SHEAR WAVE IMAGING AND WELL BORE IMAGING

FIELD OF THE DISCLOSURE

This disclosure generally relates to borehole tools, and in particular to methods and apparatuses for conducting well logging. This disclosure further relates to interpretation of well logging results in combination to optimize the application of completion treatments.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations. Thus, the tools may include sensors and/or electronics for formation evaluation and monitoring, controlling the tool itself, and so on. Evaluating the formation and planning application of completion treatments based on acoustic data and formation fluid data are both well known.

SUMMARY OF THE DISCLOSURE

In aspects, the present disclosure is related to methods, systems, devices, and products for well logging. Methods may include conveying a logging tool in the borehole on a carrier; obtaining a borehole image over at least one interval of borehole depth from well logging measurements with a downhole imaging instrument; obtaining acoustic information representative of acoustic reflections from a far-field region of the formation; obtaining quantitative borehole fluid information indicative of properties of a formation fluid in a near-field region of the borehole; generating a borehole connectivity fracture model of the formation in dependence upon the borehole image, the quantitative borehole fluid information, and the acoustic information. Methods may include identifying far-field fractures from the acoustic information; and generating the borehole connectivity fracture model of the formation in dependence upon the identified far-field fractures.

Methods may include identifying near-field fractures from the borehole image; and generating the borehole connectivity fracture model of the formation in dependence upon the near-field fractures. Methods may include identifying far-field fractures from the acoustic information; generating a fracture interpretation correlating the near-field fractures with the far-field fractures; and generating the borehole connectivity fracture model of the formation in dependence upon the fracture interpretation. Generating the borehole connectivity fracture model of the formation in dependence upon the fracture interpretation may include generating a plurality of fracture interpretations; determining a connectivity consistency of each fracture interpretation of at least a portion of the plurality of fracture interpretations using the quantitative borehole fluid information; and selecting the fracture interpretation in dependence upon the connectivity consistency.

Generating the borehole connectivity fracture model of the formation in dependence upon the fracture interpretation may include generating a plurality of fracture interpretations; determining a petrophysical consistency of each fracture interpretation of at least a portion of the plurality of fracture interpretations using the quantitative borehole fluid information; and selecting the fracture interpretation in dependence upon the petrophysical consistency.

Methods may include identifying near-field fractures at least partially open to the wellbore from the quantitative borehole fluid information, wherein the near-field fractures comprise at least some of the near-field fractures from the borehole image; identifying far-field fractures from the acoustic information; generating a fracture interpretation correlating the near-field fractures at least partially open to the wellbore with the far-field fractures; and generating the borehole connectivity fracture model of the formation in dependence upon the fracture interpretation.

Identifying the near-field fractures at least partially open to the wellbore may include at least one of: i) identifying near-field fractures at least partially open to the wellbore from the quantitative borehole fluid information; and ii) identifying near-field fractures at least partially open to the wellbore using near-field acoustic data.

Methods may include estimating fluid content from the quantitative borehole fluid information and identifying a fracture with critical stress connectivity in dependence upon fluid content. Methods may include applying a completion treatment in dependence upon the borehole connectivity fracture model. Methods may include identifying position information comprising at least one of: i) borehole depth, ii) azimuth, and iii) strike of at least one of the near-field fractures from the borehole image; and generating the borehole connectivity fracture model of the formation in dependence upon the position information.

Methods may include conducting further operations in dependence upon the borehole connectivity fracture model. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
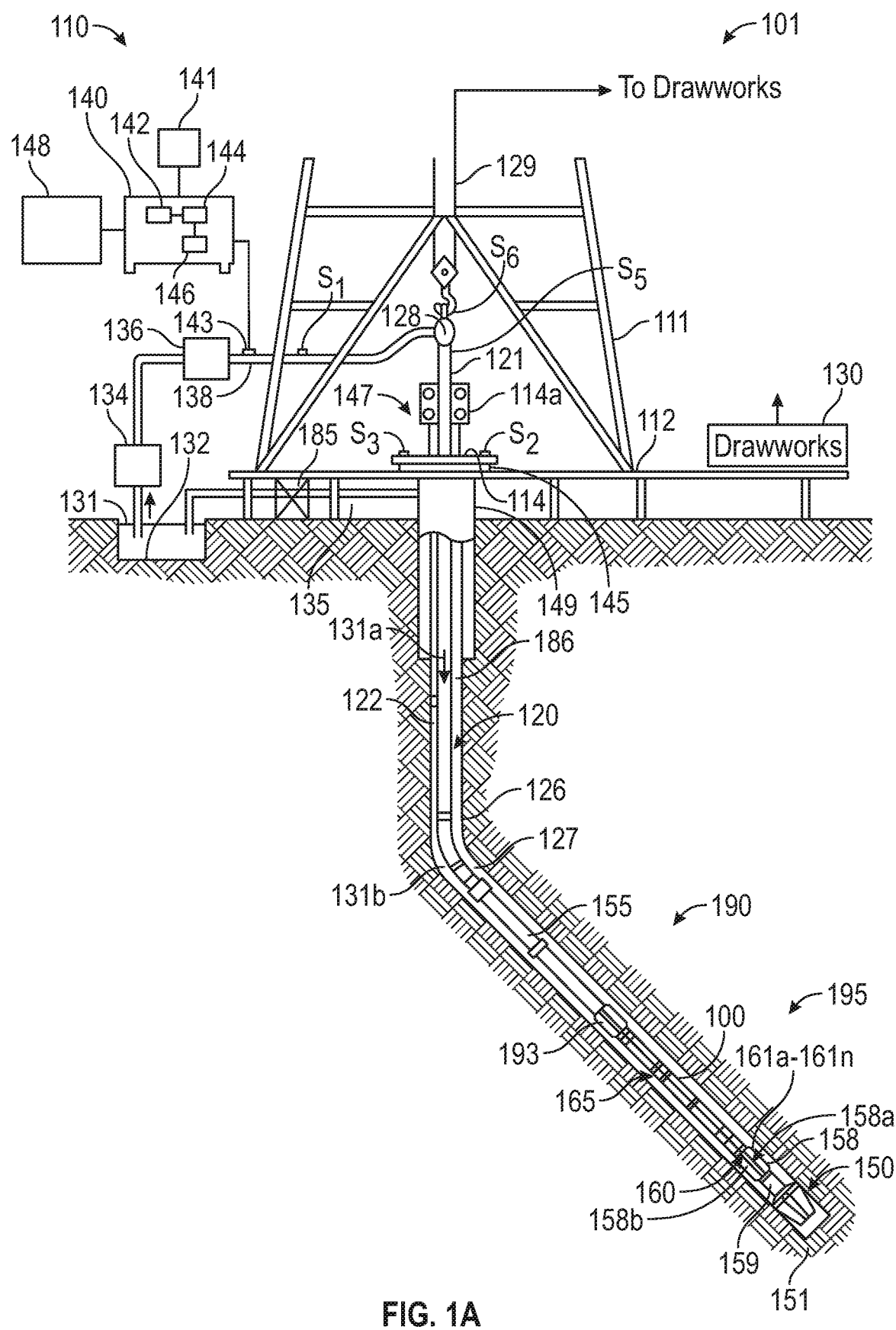
FIGS. 1A and 1B illustrate components of systems in accordance with embodiments of the present disclosure.

Aspects of the present disclosure relate to apparatus and methods for well logging, including measurement and interpretation of physical phenomena indicative of parameters of interest of the formation, the borehole, downhole fluids in one of these, or combinations of the same. Other aspects relate to the combination of well logging data with formation fluid data in a model estimating fracture characteristics of a formation, and to determine an optimal completion treatment plan from the model which optimizes production of hydrocarbons. The completion treatment plan may include stimulation (e.g., hydraulic fracturing) of the formation to improve hydrocarbon production by improving connectivity of the formation to a wellbore. Techniques described herein are particularly suited to horizontal drilling.

Aspects of the disclosure include estimating properties of an earth formation based on an integration of multiple measurement types. More particularly, features identified in borehole imaging information are correlated with candidate features of far-field acoustic measurement information and resolved with quantitative formation fluid measurement information. A near-field region includes the surface of a borehole and may extend laterally into the formation, e.g., about 1-2 inches into the formation. The far-field region extends laterally a further distance, and thus encompasses a larger volume around the borehole. Methods may include estimating properties of fracture networks (sometimes including individual fractures), based on the integration. The formation may be modeled with respect to these properties, and the fracture network may be represented by the model. Customized completion treatment models may be generated for the formation, and completion characteristics may be estimated for one or more of the models.

General method embodiments include obtaining a borehole image over at least one interval of borehole depth from well logging measurements with a downhole imaging instrument; obtaining acoustic information representative of acoustic reflections from a far-field region of the formation; obtaining quantitative borehole fluid information indicative of properties of a formation fluid in a near-field region of the borehole; and generating a borehole connectivity fracture model of the formation using the borehole image, the quantitative borehole fluid information, and the acoustic information.

Method embodiments further include obtaining acoustic information representative of acoustic reflections from a far-field region of the formation. Obtaining the acoustic information may be carried out, for example, by using Deep Shear Wave Imaging ('DSWI') techniques, such as, for example, using a low frequency cross dipole mode to obtain information that is distant from the borehole. Such measurements could be obtained using a tool such as the XMAC cross-dipole acoustic logging compatible tools available from Baker Hughes, a GE Company, LLC.

DSWI data may be employed to estimate far-field fracture properties, such as the extent (e.g., length), intensity (e.g., fracture width or how open is the fracture), orientation, and/or density of critically stressed fractures in the far-field region. Critically stressed fractures are fractures that are favorably oriented to fail in shear under stress conditions at the time of measurement. In combination with the identified near-field natural fracture systems (fault and fractures) derived by the processing of one or more borehole images, the acoustic information may provide fracture results and establish connectivity. Reconciling near-field and far-field fracture results in the generation of one or more near-field to far-field fracture interpretations.

DSWI data may be used to identify and characterize fractures in the far-field, and properties of borehole fluid may be analyzed to determine whether fractures existing in the near-field are connected to a far-field fracture network. Properties of borehole fluid can be analyzed in combination with DSWI data to determine whether open or partially open fractures, including hydrocarbon- or water-bearing fractures occur only within the near-field environment, or are potentially connected to a far-field fracture system.

DSWI data may be used to estimate properties of various types of fracture systems, such as the presence and type of fluid and properties of minerals, cements and other materials in the formation. DSWI data may be used to differentiate natural fracture sets from those resulting from stimulation ("man-made fractures").

Quantitative borehole fluid information obtained from borehole fluid and indicative of properties of a formation fluid in a near-field region of the borehole may be employed to resolve the near-field to far-field fracture interpretations in order to develop a fracture model. Quantitative analysis of borehole fluids and gases, which may be carried out at the surface, is one data set used in the evaluation technique of the present disclosure. For example, a drill string or logging string is disposed within a borehole in a formation. During downhole operations, fluid (e.g., drilling mud) may be circulated into the borehole and returned to the surface (as downhole fluid), where it is analyzed to measure fluid properties. This quantitative analysis may include quantitative borehole fluid parameters representative of wellbore hydrocarbon volumetrics, saturation, and porosity and permeability of the formation. These parameters may be indicative of fluid type (e.g., water, light oil, heavy oil, natural gas, etc.), fluid contacts, presence and degree of reservoir connectivity, and characteristics of fractures in the formation. More specifically, fluid parameters may be analyzed to estimate flow properties of the formation, which may be used to identify and characterize fractures. For example, chemical analysis may be performed to determine the fluid composition to characterize whether fractures are water bearing or hydrocarbon bearing. Aspects of the present disclosure correlate these indicators with one or more specific critically stressed fracture systems that are partially or fully open to the well bore. These may include both natural and induced fracture systems.

Past well mud logging techniques have employed gas chromatography to ascertain the presence of different hydrocarbon species in the mud being returned. It is possible to compare the ratios of methane to each of several other hydrocarbon gases, such as ethane, propane, butane and pentane, to characterize a well's productivity. See Pixler, B.

O., Formation Evaluation by Analysis of Hydrocarbon Ratios, Journal of Petroleum Technology, pp. 665-670 (June 1969). Formation property data derived from mud logs and drilling parameter logs may be analyzed to estimate "optimal target zones", or formation regions that are most amenable to stimulation, to facilitate hydraulic fracturing or other stimulation operations. Mud log data is generally used only by well-site geologists or engineers as a support tool for drilling engineering. Several factors inhibit the use of mud logging data in formation evaluation, such as uncertainty in related depth, large uncertainty in porosity/permeability estimation, and the lack of well-defined indicators to use in formation evaluation. Embodiments described herein employ mud log data in combination with other logging data to model the formation in connection with formation evaluation, stimulation and production.

As noted above, method embodiments may include acquiring quantitative borehole fluid information (e.g., fluid log or mud log data, fluid sample data, etc.) and estimating quantitative borehole fluid near-field fracture properties therefrom. Such quantitative borehole fluid near-field fracture properties therefrom may be representative of whether there are critically stressed fractures in the near-field and intersecting a borehole, the extent and/or density of near-field fractures, connectivity between far-field fractures and the borehole, and so on. One or more connectivity parameters may represent whether critically stressed fracture systems identified in the near field are connected to far-field fracture systems.

Imaging tools may be used to generate an image of the borehole wall. A high resolution image log may be obtained using a high resolution electromagnetic imager (e.g., resistivity imager), acoustic imager, optical imager, and so on. Image processing identifies fractures or other features on the wall of the borehole. Identified fractures incident on the wellbore provide the total (i.e., open, partially open, and closed) fracture systems, including both natural and induced fractures. Image, as the term is used herein, refers not only to images in the conventional context of downhole oilfield tools, but also to other representations of fracture properties of the formation at the borehole wall. In particular embodiments, borehole images may comprise information representative of a distribution of fracture properties in the borehole, including, in some implementations, azimuthal distributions around the borehole (e.g., in two dimensions). It may be determined whether a fracture or fracture set is at least partially open by processing a borehole image. Ultrasonic acoustic images are the preferred downhole method for imaging the "openness" of fractures along the borehole wall, although optical images may also be used when a transparent fluid is present in the borehole.

Methods include generating a borehole connectivity fracture model of the formation using the borehole image, the quantitative borehole fluid information, and the acoustic information, which may include determining a net post stimulation and completion stimulated rock volume (SRV), as well as the appropriate stimulation and completion geoengineered completion design. Methods may include combining the borehole image, the quantitative borehole fluid information, and the acoustic information, and estimating, by a processing device, at least one fracture characteristic of a volume of interest of the near-field region and/or the far-field region of the formation based on the combined data. The combination of identifying total fracture systems at the well bore with derived fluid parameters characterizing a net fracture capability prior to stimulation treatments may be used in conventional and unconventional (e.g., tight, complex, fractured basement completions) applications.

As described above, estimated quantitative borehole fluid near-field fracture properties may be compared with far-field fracture parameters to correlate connectivity between near-field and far-field fractures. Aspects of the present disclosure may include geoengineering a completion or production solution based on properties of the formation estimated in accordance with embodiments of the present disclosure. For example, aspects of the disclosure may ascertain a target depth and azimuth of the wellbore to apply a completion treatment to optimize production. More particularly, treatments may open closed fractures or provide an alternate induced fracture to provide enhanced connectivity to fracture systems in the near-field and/or far-field regions by application at the target depth based on fracture parameters of volumes of interest of the near-field and/or far-field regions of the formation. The alternate induced fracture(s) may be correlated with a closed fracture.

In embodiments, at least one acoustic sensor may be employed as part of one or more downhole acoustic well logging tools or distributed sensor systems to produce acoustic information responsive to an acoustic wave from the earth formation. The sensor may include at least one acoustic transmitter and at least one acoustic receiver disposed on a carrier in the borehole. A receiver and transmitter may be implemented as the same transducer, different transducers, or one or more transducer arrays. The information is indicative of a parameter of interest. The term "information" as used herein includes any form of information (analog, digital, EM, printed, etc.), and may include one or more of: raw data, processed data, and signals.

Methods may include estimating a parameter of interest from the information, evaluating the formation using the parameter of interest, and/or performing further borehole or formation operations in dependence upon the location of the reflection points, the location of the boundary, the parameter of interest of the boundary, or other parameters of interest derived from these. In particular embodiments, a state of drilling operations, characteristics of the borehole or formation, or orientation of components of the downhole tool may be estimated using the parameter of interest, and then used in performing an operation as described above.

Aspects of the present disclosure are subject to application in various different embodiments. The carrier may be a drill string, coiled tubing, a slickline, an e-line, a wireline, etc. A downhole tool may be coupled or combined with additional tools, including, e.g., some or all the information processing system, as shown in FIG. 1B, discussed in further detail below. In some general embodiments, a carrier is implemented as a tool string of a drilling system, and the acoustic wellbore logging may be characterized as "logging-while-drilling" (LWD) or "measurement-while-drilling" (MWD) operations. As described herein, "borehole" or "wellbore" refers to a single hole that makes up all or part of a drilled well. Depending on the configuration, systems shown herein may be used during drilling and/or after the wellbore has been formed, including, in some instances, after the installation of casing or production infrastructure. While a land system is shown, the teachings of the present disclosure may also be utilized in offshore or subsea applications. As described herein, "formations" refer to the various features and materials that may be encountered in a subsurface environment and surround the borehole.

Figure 1B:
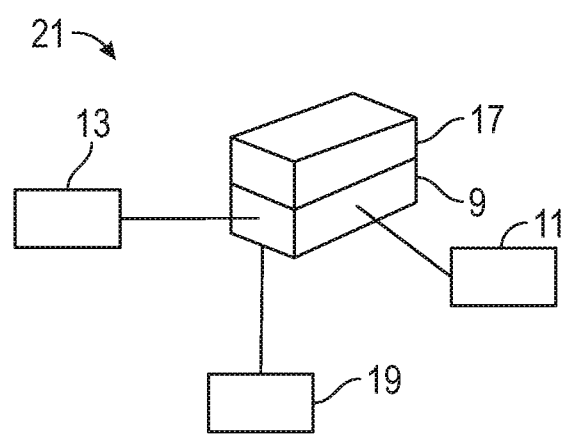

FIGS. 1A and 1B illustrate components of systems in accordance with embodiments of the present disclosure. FIG. 1A is a schematic diagram of an example drilling system 101 according to one embodiment of the disclosure. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and borehole fluid sensors, such as quantitative fluid sampling unit 185. Quantitative fluid sampling unit 185, which may include a drill cutting analysis module which analyses the drill cuttings 186 from the returning drilling fluid 131b, a chemical fluid analysis module, nuclear analysis module, and gas analyzers implemented using, for example, spectrometers, chromatographs, microconduit sensors, electrical sensors, resonant sensors, and so on, each may provide quantitative borehole fluid information. An example gas analyzer may provide parameters representative of the fraction, total, or other property of chemical components such as methane (C1), ethane (C2), propane (C3), butane (C4), pentane (C5), carbon dioxide, carbon monoxide, hydrogen sulfide, helium, hydrogen, oxygen, nitrogen, or other gaseous elements or molecules compounds typically found in drilling fluid conduits, or combinations of the same.

Drill cuttings analysis module may include an ultrasonic sensor system used to determine the amount of cuttings in the wellbore at a given time, along with the size, shape and the accumulation of the cuttings. Drill cuttings analysis module may also provide parameters representative of thermal maturity, lithological, mineralogical, and geomechanical properties of the formation, such as, for example, using NMR analysis. See for example, U.S. Pat. No. 6,044,327 to Goldman, U.S. patent application publication No. 2006/0272812 to Yu, U.S. patent application publication No. 2017/0260855 to Yang et al., U.S. patent application publication No. 2018/0202263 to Prasad et al., incorporated herein by reference in its entirety.

All or a portion of quantitative fluid sampling unit 185 may alternatively be implemented downhole, e.g., as instruments on the BHA. See for example, U.S. Pat. No. 6,977,499 to Kiesl et al., and U.S. Pat. No. 9,617,851 to Dahl et al., each incorporated herein by reference in its entirety.

A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 126. The well control system 147 includes a surface blow-out-preventer (BOP) stack 115 and a surface choke 149 in communication with a wellbore annulus 127. The surface choke 149 can control the flow of fluid out of the borehole 126 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as MWD or LWD sensors) such as the acoustic sensors described above, as well as sensors for determining resistivity, density, porosity, permeability, other acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165, and include counterparts to the sensor(s) 5 described above with respect to FIG. 1A. The BHA 190 may further include a variety of other sensors and devices 159 for determining one or more properties of the BHA 190 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158*a* to orient the bent sub in the wellbore and the second steering device 158*b* to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 190 to provide the required force on the drill bit.

Example sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES, A GE COMPANY, LLC.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art.

In embodiments, the MWD system utilizes mud pulse telemetry to communicate data from a downhole location to the surface while drilling operations take place. Various mud-pulse telemetry systems may be implemented. U.S. Pat. No. 3,764,968 describes a rotating valve for the purpose to transmit frequency shift key (FSK) or phase shift key (PSK) coded signals. U.S. Pat. No. 6,898,150 to Hahn et al, commonly owned and incorporated by reference herein in its entirety, discloses a hydraulically balanced reciprocating pulser valve. U.S. Pat. No. 7,417,920 to Hahn et al, commonly owned and incorporated by reference herein in its entirety, discloses an improved reciprocating pulser valve. Different types of valve systems are used to generate downhole pressure pulses. Valves that open and close a bypass from the inside of the drill string to the wellbore annulus create negative pressure pulses, for example see U.S. Pat. No. 4,953,595. Valves that use a controlled restriction placed in the circulating mud stream are commonly referred to as positive pulse systems, for example, see U.S. Pat. No. 3,958,217. Another example of a negative pulsing valve is illustrated in U.S. Pat. No. 4,351,037. This technology includes a downhole valve for venting a portion of the circulating fluid from the interior of the drill string to the annular space between the pipe string and the borehole wall. Drilling fluids are circulated down the inside of the drill string, out through the drill bit and up the annular space to surface.

While a drill string 120 is shown as a conveyance device for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 101 may include a bottomhole assembly and/or sensors and equipment for implementation of embodiments of the present disclosure on either a drill string or a wireline.

A point of novelty of the system illustrated in FIG. 1A is that the surface processor 142 and/or the downhole processor 193 are configured to perform certain methods (discussed below) that are not in the prior art. Surface processor 142 or downhole processor 193 may be configured to control mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include geosteering, changing drilling parameters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 142, downhole processor 193, or other processors (e.g. remote processors) may be configured to use at least one sensor to produce a corresponding signal, responsive in part to a reflection of an emitted wave, from each of a plurality of azimuthally distributed orientations about a BHA. In some general embodiments, surface processor 142, downhole processor 193, or other processors (e.g. remote processors) may be configured to operate the tool 101 to excite and measure acoustic signals.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control. In embodiments, electronics associated with sensors 107 may be configured to record and/or process the information obtained (see FIG. 1A & FIG. 2).

FIG. 1B shows a hardware environment in accordance with embodiments of the present disclosure. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

Systems as described above may be used to automatically perform quantitative fluid analysis on the wellbore fluid, either as a return fluid, injection fluid, at one or more points in the wellbore, and/or combinations of these. Quantitative fluid sampling unit 185 may include detection systems for total gas (that is, a quantitative measurement of the amount of gas being extracted from the mud by a gas trap) including, for example, catalytic filament detectors, hydrogen flame ionization detectors, and so on, as are known in the art. Detailed analysis of the hydrocarbon mixture may be performed by a gas chromatograph or the like at the surface (or conversely, in the borehole). Quantitative fluid sampling unit 185 may include components configured for detection, distinction and quantification of gases such as methane (C1), ethane (C2), propane (C3), butane (C4), hydrogen sulfide, carbon dioxide, nitrogen, and other gases and vapors present. See, for example, U.S. Pat. No. 4,833,915 to Radd et al., U.S. Pat. No. 4,887,464 to Tannenbaum et al., U.S. patent application publication No. 2016/0115786 to Breviere et al., and U.S. Pat. No. 7,219,541 to DiFoggio, each incorporated herein by reference. See also U.S. Pat. No. 6,997,055 to DiFoggio, incorporated herein by reference. A log of recorded values may be kept and associated with cuttings parameters, drilling parameter values (e.g., ROP, mud weight, temperature, pressure, pump rate), and an estimated borehole depth. An example log may include total gas, methane (C1), ethane (C2), propane (C3), and butane (C4) and so on, along with ratios of these (e.g., C1/C2). Aspects of the present disclosure include analysis and interpretation of logs of at least one ratio of mud gases.

In other examples, samples of fluid produced from the reservoir are collected downhole in tanks for transport to surface laboratories where Pressure-Volume-Temperature (PVT) studies and fluid properties such as density, viscosity and composition are measured.

Systems as described above may be used to automatically characterize an acoustically reflective boundary in the earth formation by estimating at least one property of the acoustic reflective boundary, including an estimate of the location of the boundary with respect to the tool, within the formation, or according to other global coordinate systems. Estimating the location of the boundary as described above may include estimating the boundary's position and orientation (e.g., dip). In particular embodiments, a logging system is configured for imaging away from the borehole, with P and S body waves radiated into the formation directly around the transmitter.

Figure 2:
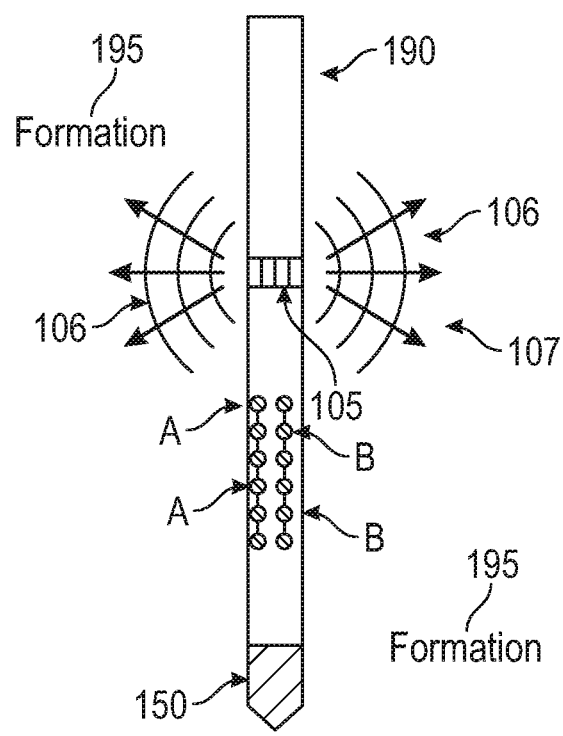
FIG. 2 is a schematic view of an acoustic LWD tool system on a BHA drill collar containing a drill bit.

FIG. 2 is a schematic view of an acoustic LWD tool system on a BHA drill collar 190 containing a drill bit 150. This system is mounted on the BHA drill collar 190 for performing acoustic measurements while the formation is being drilled. The acoustic logging while drilling tool system has a source 105 to emit acoustic vibrations 106 that may traverse formation 195 and may also be propagated along the borehole wall and be received by sensors A and B which may be in arrays. Collectively, transmitters, receivers, and associated circuitry comprises sensor(s) 107. Suitable filtering techniques, including phased arrays, may be employed to reduce the drillbit noise. In an alternate embodiment of the disclosure, the transmitter 105 may be located between the sensors and the drillbit 150.

Figure 3:
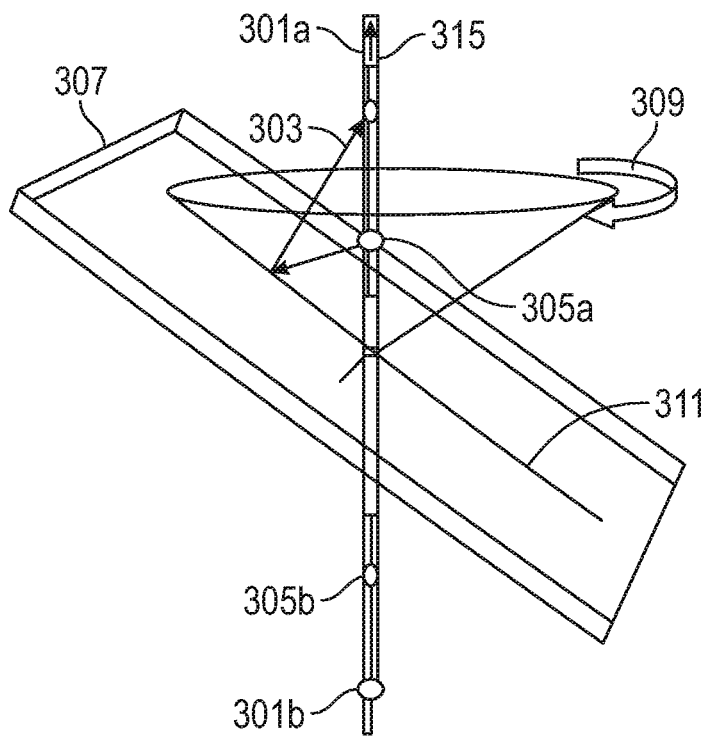
FIG. 3 illustrates how borehole acoustic measurement can obtain the geological structural information away from the borehole.

FIG. 3 illustrates how borehole acoustic measurement can obtain the geological structural information away from the borehole. Depicted is a logging tool having one or more sources 301a, 301b crossing a dipping bed 307 intersecting the borehole 315. As an acoustic source on the tool is energized, it generates acoustic waves that can be classified into two categories according their propagation direction. The first is the waves that travel directly along the borehole. These direct waves are received by an array of receivers (not shown) on the tool and subsequently used to obtain acoustic parameters, such as velocity, attenuation, and anisotropy, etc., for the formation adjacent to the borehole. The waves of the second category are the acoustic energy that radiates away from the borehole and reflects back to the borehole from boundaries of geological structures. These waves are called secondary arrivals in acoustic logging data because their amplitudes are generally small compared to those of the direct waves. As shown in this figure, depending on whether the tool is below or above the bed, acoustic energy strikes the lower or upper side of the bed and reflects back to the receiver as the secondary arrivals. An exemplary raypath 303 for such a reflected wave is shown.

Azimuthal ambiguity may be resolved using directional acoustic measurements in a borehole. These directional measurements can be made with an acoustic tool that has a dipole source and/or receiver system. U.S. Pat. No. 4,649,525 to Angona et al discloses the use of a dipole acoustic logging for determination of formation shear velocities. A very useful property of a dipole source or receiver system is its directionality. That is, the generated or the received wave amplitude A depends on the angle θ between the wave's associated particle motion direction (polarization) and the source or receiver orientation, and may be denoted by $$A \propto \cos \theta \qquad (1).$$

With this directionality, one can use oriented source and/or receiver(s) to generate and record acoustic wave energy. An acoustic measurement made in this way is called the directional measurement. In fact, the directionality property of the dipole source/receiver has been utilized to determine formation azimuthal shear-wave anisotropy. In the present invention, the directionality of the wave amplitudes, as measured by a directional acoustic system, is used to determine the azimuth of a near-borehole structure.

Such directional measurements using dipole transmitters and/or receivers have been disclosed in U.S. Pat. No. 6,176,344 to Lester having the same assignee as the present invention and the contents of which are fully incorporated herein by reference.

U.S. Pat. No. 7,035,165 to Tang having the same assignee as the present disclosure and the contents of which are incorporated herein by reference discloses a method in which a plurality of multicomponent acoustic measurements are obtained at a plurality of depths and for a plurality of source-receiver spacings on the logging tool. An orientation sensor on the logging tool, such as a magnetometer, may be used for obtaining an orientation measurement indicative of an orientation of the logging tool. The multicomponent measurements are rotated to a fixed coordinate system (such as an earth based system defined with respect to magnetic or geographic north) using the orientation measurement, giving rotated multicomponent measurements. The rotated multicomponent measurements are processed for providing an image of the subsurface. While the problem of Stoneley waves is not specifically discussed in Tang, examples shown by Tang and good signal-to-noise ratio for imaging of interfaces, e.g., bed boundaries.

U.S. Pat. No. 8,055,448 B2 to Mathiszik et al., having the same assignee as the present disclosure and the contents of which are incorporated herein by reference, discloses further improvements in MWD acoustic imaging. A downhole acoustic logging tool is used for generating a guided borehole wave that propagates into the formation as a body wave, reflects from an interface and is converted back into a guided borehole wave. Guided borehole waves resulting from reflection of the body wave are used to image a reflector. U.S. Pat. No. 8,811,114 B2 to Geerits et al., having the same assignee as the present disclosure and the contents of which are incorporated herein by reference, discloses further improvements in MWD acoustic imaging.

Having multiple sources axially distributed in the drillstring enables the performance of a multi-offset measurement (variable source-receiver and source-reflector distance) in one run. With only one source in the drillstring this could be achieved by repetitive measurements while drilling ahead only. Mapping the same reflector with changing source-reflector distances as well as having varying source-receiver offsets is beneficial for proper data evaluation.

Techniques of the present disclosure may be iteratively applied at a plurality of borehole depths, on a continuously updated basis. As one example, one or more transmitters or receivers may be positioned on the tool which is conveyed in the borehole. A series of pulses may be transmitted from various positions on the tool as the tool moves within the borehole. Direct and reflection wave separation and reflection data enhancement in accordance with conventional processing may be performed, and conventional estimation of formation slowness may be obtained, as described in further detail below. The acoustic data may be a result of acoustic pre-processing (e.g., noise reduction, filtering, removal or attenuation of direct waves and multiples). The large amplitude direct arrivals in the borehole data may be removed before processing the secondary arrivals of much smaller amplitude, for example.

One processing sequence used for processing the data is described in Li et al. for processing monopole data, but which may be applied for multipole data as well. A bandpass filtering (high cut) technique may be used to first remove the low-frequency events, such as the low-frequency Stoneley waves generated by a monopole source, or the low-frequency flexural-shear waves generated by a dipole source. A median filter may be applied to remove the direct waves. Afterwards, wave-separation techniques may be applied to separate the secondary arrivals from the direct arrivals based on their moveout characteristics. For example, in the single-receiver data gathered for various depths (or tool positions), the direct arrivals have a small moveout because their propagation distance (source-to-receiver spacing) is fixed. In comparison, the reflection events have a large moveout because their propagation distance changes as the tool moves close to or away from the reflector. A number of techniques may be used for the wave separation, e.g., f-k methods such as that taught by Hornby, or a combination of f-k and median filtering by Li et al, etc. The separated waves, according to their moveout, are sorted into reflected upgoing and reflected down-going subsets. Optionally, a dip median filter may be applied to enhance the downgoing and upcoming reflections.

The data may be windowed to exclude converted waves and multiples. In conventional imaging techniques, following this, the secondary arrivals (reflection events) from the wave-separation procedure are then respectively migrated to image the upper and lower side of the formation reflector using one or more well-known migration techniques, e.g., the back-projection scheme using a generalized Radon transform as discussed by Hornby, or the commonly used Kirchoff depth migration method as discussed, for example by Li et al. After conventional migration, the acoustic component data would be mapped into a two-dimensional ('2D') domain.

Methods may include generating an image representative of the formation over an interval of borehole depth. A high-resolution borehole image log may provide accurate vertical resolution of resistivity and/or changes in resistivity as small as a few millimeters. The borehole imaging instrument may be at least one of: i) an acoustic imager; ii) a resistivity imager; iii) an RF imager; iv) an optical imager; and v) a nuclear imager. Borehole imaging may include using at least one acoustic sensor to produce information responsive to a reflection of an emitted acoustic wave from the borehole wall. The term "information" as used herein includes any form of information (analog, digital, EM, printed, etc.), and may include one or more of: raw data, processed data, and signals.

Control of components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 142, downhole processor 193, or other processors (e.g. remote processors) may be configured to use at least one sensor to produce a corresponding signal, responsive to a reflection of an emitted wave, from each of a plurality of azimuthally distributed orientations about a BHA. One of the processors may also be configured to estimate from the information from each of the orientations an azimuthal variation of the parameter of interest. One of the processors may also be configured to cause the corresponding emitted wave.

In operation, a portion of the emitted wave reflects from the borehole wall proximate the sensor, and the reflection is detected by the sensor. Thus, each sensor produces a response indicative of geometry and features of the borehole wall reflecting the corresponding emitted wave or waves.

Figure 4A:
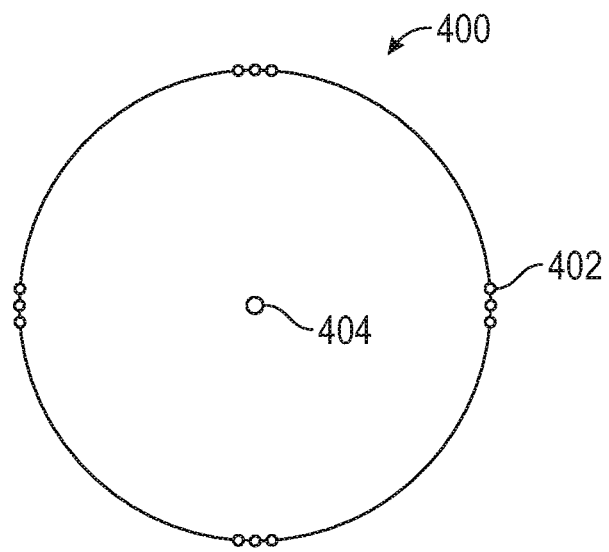
FIGS. 4A-4C illustrate borehole imaging in accordance with embodiments in accordance with embodiments of the present disclosure.
Figure 4B:
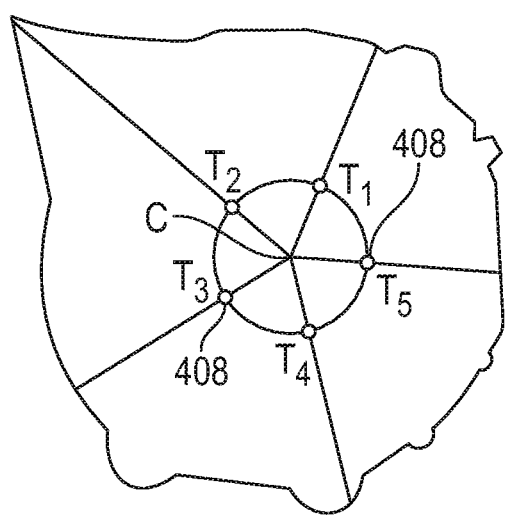
Figure 4C:
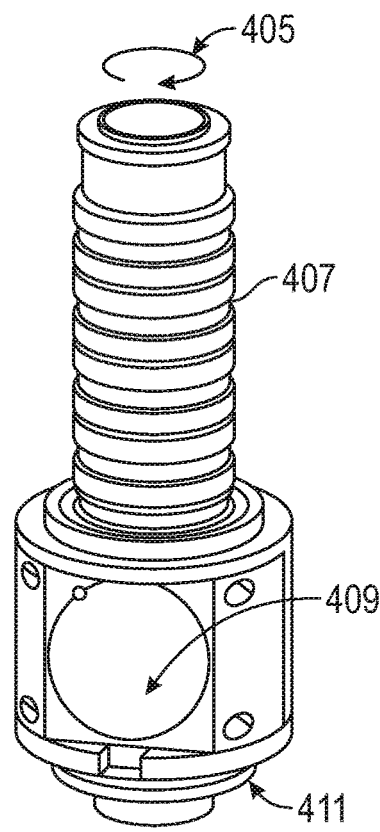

FIGS. 4A-4C illustrate borehole imaging in accordance with embodiments in accordance with embodiments of the present disclosure. FIGS. 4A and 4B show a cross section of a BHA having a plurality of corresponding azimuthally distributed sensors. In FIG. 4A, the sensors 402 are non-uniformly distributed about a longitudinal axis 204 of the BHA 400. In FIG. 4B, BHA 400 includes five uniformly distributed (e. g. 72° apart) acoustic transducers 408 labeled T1-T5. The sensors may be electromagnetic, optical, or acoustic. Sensors 402 and 408 may be solid-state ultrasonic acoustic transducers. Appropriate sensors may include a highly granular response, such as, for example, capable of response to particles as small as 1 millimeter, 0.1 millimeters, 0.01 millimeters, or smaller, taking up a volume of less than 1 percent of the fluid interval of the borehole surrounding the BHA. In particular embodiments, the transducers may be configured to emit an acoustic wave and receive a reflection of the wave. Other embodiments may include additional transducers or other devices for producing the emitted waves.

The system may be configured, using a processor and sensor circuitry operatively coupled to sensors 402, 408 (or alternatively, to additional transducers), to emit waves. The waves may be acoustic, optical (e.g. laser), or electromagnetic (e.g. RADAR). The system may be configured to emit waves at multiple frequencies (e.g., combined frequencies, performing a frequency sweep, etc.). Resolution may be increased (e.g., smaller features detected) by using waves having shorter wavelengths. However, the specific frequencies or range of frequencies used may be selected in dependence upon expected characteristics of the borehole (including downhole fluid density), or of the formation. These characteristics may be inferred from historical data or by analogy, or estimated using other techniques known in the art. Use of multiple frequencies may also facilitate estimation of a parameter of interest despite changes in density of the downhole fluid and changes in distance to the borehole wall.

Referring to FIG. 4B, some processing techniques may rely on the azimuthal distribution of information. The azimuthal distribution of the sensors provides identifiable differences in response with respect to azimuthal orientation that may be used for the characterization and classification of the wellbore.

Aspects of the present disclosure relate to using at least one acoustic sensor as part of one or more downhole acoustic well logging tools or distributed sensor systems to produce acoustic information responsive to an acoustic wave from the earth formation. The sensor may include at least one acoustic transmitter configured and at least one acoustic receiver disposed on a carrier in the borehole, and configured to implement techniques of the present disclosure, as described in further detail below. A receiver and transmitter may be implemented as the same transducer, different transducers, or one or more transducer arrays. The information is indicative of a parameter of interest. The term "information" as used herein includes any form of information (analog, digital, EM, printed, etc.), and may include one or more of: raw data, processed data, and signals. Near-field acoustic data may include both image data and non-image data. As one example, near-field acoustic data may include data indicative of a response from Stoneley waves originating from a borehole acoustic logging instrument. This response may be indicative of the open or closed state of fractures intersecting the borehole wall. The Stoneley wave is both attenuated and delayed in time (phase shifted) if it crosses an open fracture (the fracture assumed to be filled with borehole fluid in this case). Detection of these conditions may thus be used to estimate whether a fracture or fracture set is open.

FIG. 4C illustrates another sensor in accordance with embodiments of the present disclosure. The sensor comprises a rotating platform 405 with an ultrasonic transducer assembly 409. The rotating platform is also provided with a magnetometer 411 to make measurements of the orientation of the platform and the ultrasonic transducer. The platform is provided with coils 407 that are the secondary coils of a transformer that are used for communicating information from the transducer and the magnetometer to the non-rotating part of the tool. The transducer may be made of a composite material. In operation, the transducer may be made to rotate about the longitudinal axis of the BHA, and to receive at each of the plurality of azimuthally distributed orientations the reflection of the corresponding emitted wave and produce the corresponding information. In other embodiments, a multi-directional acoustic sensor may be used. The multi-directional acoustic sensor may be configured for beamforming to receive from each of a plurality of azimuthally distributed orientations the reflection of the corresponding emitted wave. The sensor may then produce corresponding information associated with each orientation.

General method embodiments in accordance with the present disclosure may include identifying critically stressed fractures in the far-field region and estimating fracture parameters corresponding to properties of the critically stressed fractures. A combination of the identified fractures and the corresponding fracture parameters with quantitative borehole fluid information comprise a fracture profile providing a description of the fracture network around the borehole.

Figure 5:
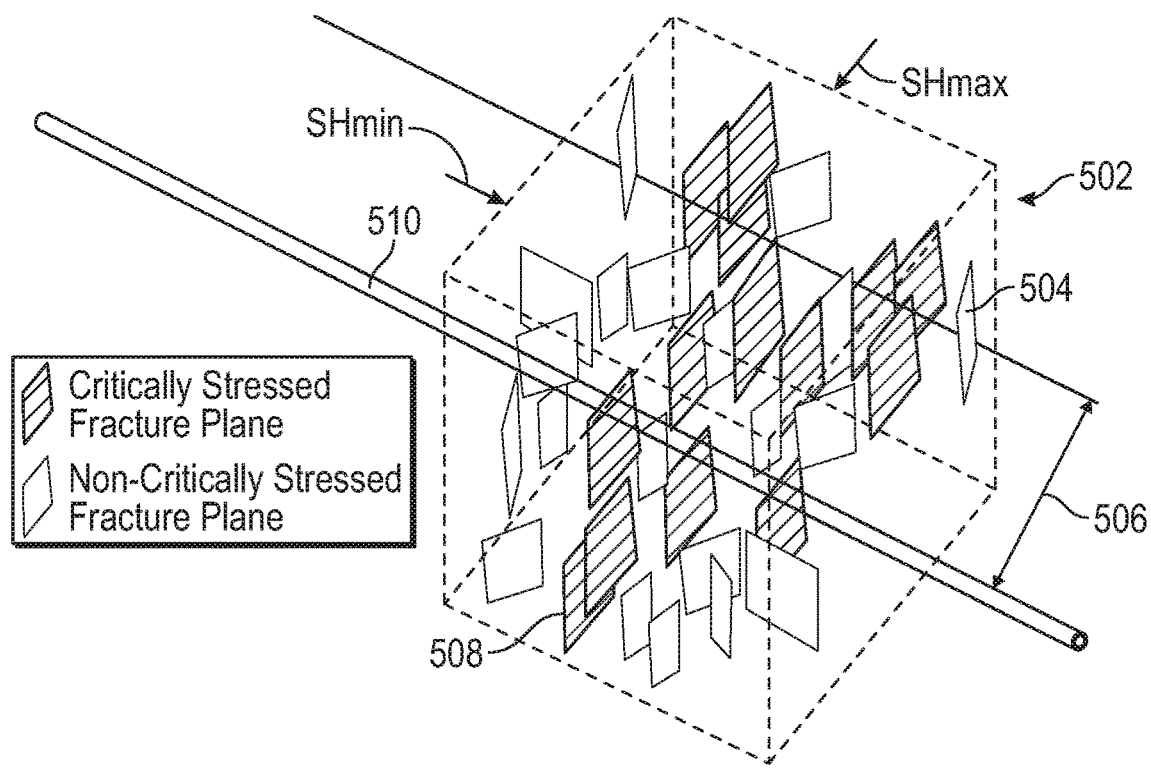
FIG. 5 illustrates identified fracture planes of an earth formation surrounding a borehole in accordance with embodiments of the present disclosure.

FIG. 5 illustrates identified fracture planes of an earth formation surrounding a borehole in accordance with embodiments of the present disclosure. FIG. 5 shows various fractures in a far-field region 506 of an earth formation 502 surrounding a borehole 510. The fracture planes include non-critically stressed fracture planes 506 and critically stressed fracture planes 508. Critically stressed fractures are typically oriented parallel to the direction of the greatest horizontal stress ($S_{Hmax}$).

A fracture profile in accordance with embodiments of the present disclosure may include acoustic information representative of acoustic reflections from a far-field region of the formation, borehole image information, and quantitative borehole fluid information. The profile is indicative the presence of far-field fractures and also an associated productivity potential. The profile may also be indicative an associated fluid type (e.g., hydrocarbon type, water). The profile may include drilling parameters (e.g., revolutions per minute (RPM), weight-on-bit (WOB), mud weight, and mud viscosity), mud log data (e.g., parameters relating to chemical analysis of the borehole fluid), gas logs, and the like. The profile may also include DWSI information and near-field fracture parameters derived from borehole image processing.

Figure 6:
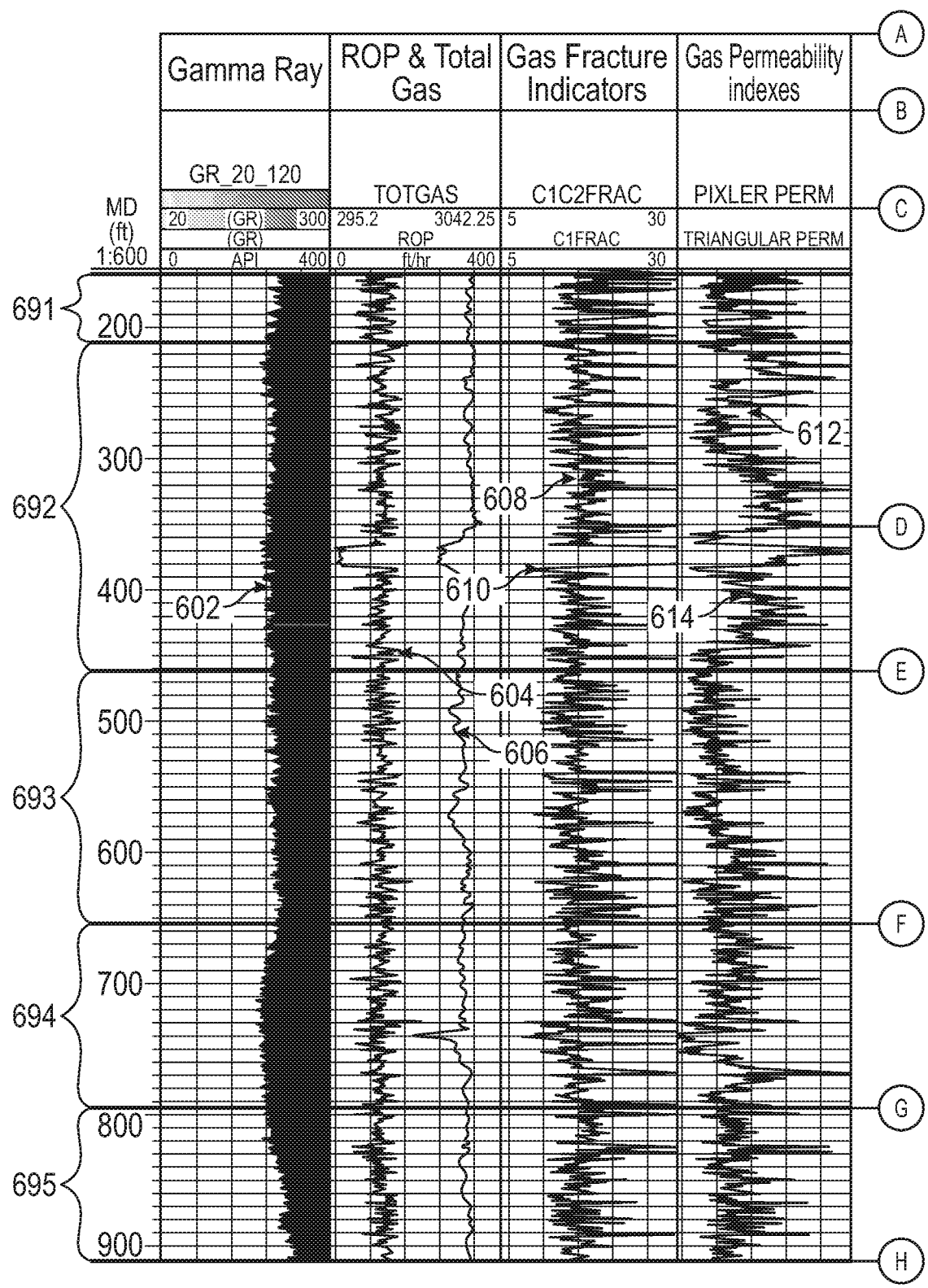
FIG. 6 illustrates a fracture profile including acoustic information representative of acoustic reflections from a far-field region of the formation, borehole image information, and quantitative borehole fluid information in accordance with embodiments of the present disclosure.
Figure 6:
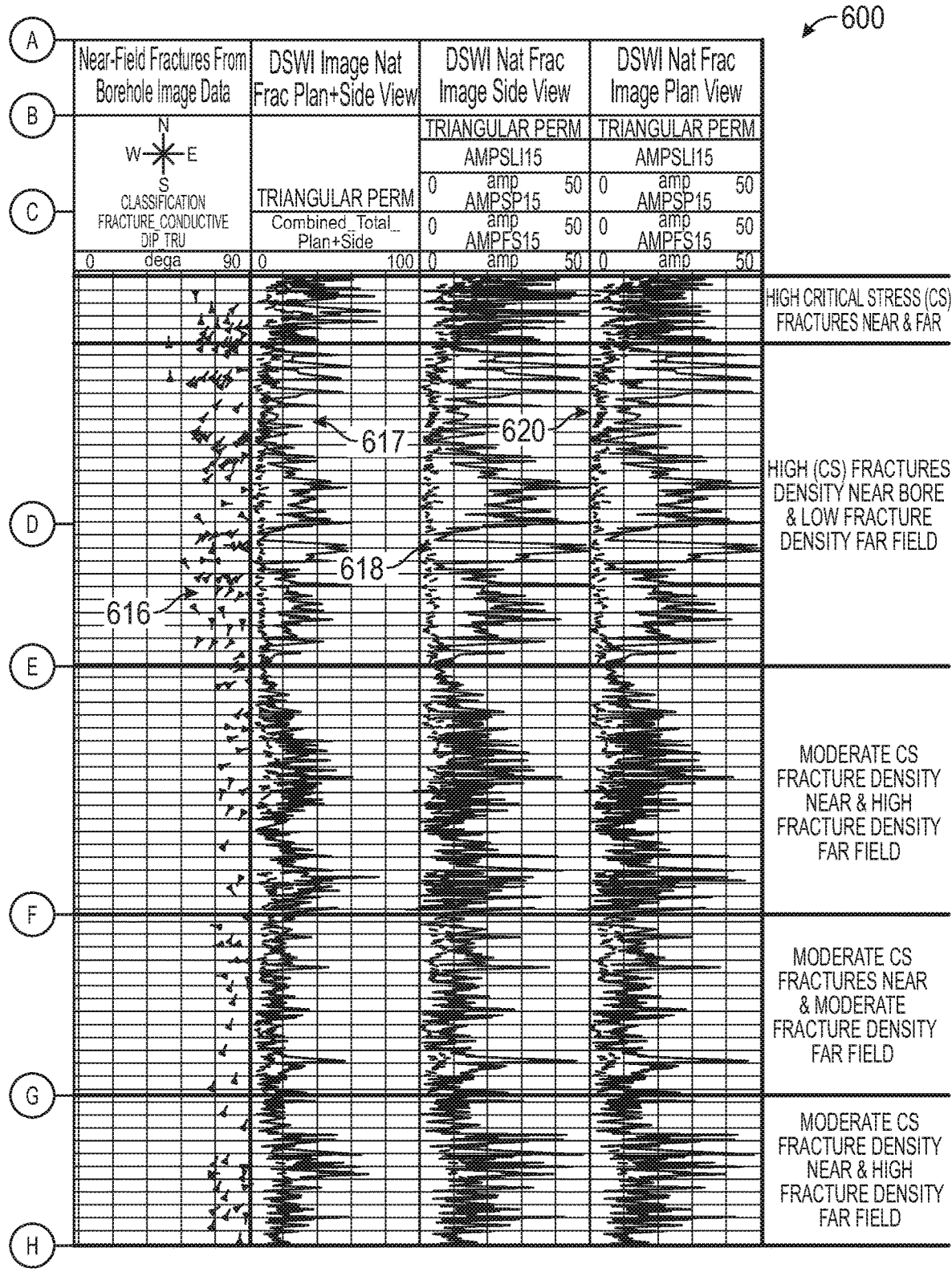

FIG. 6 illustrates a fracture profile including acoustic information representative of acoustic reflections from a far-field region of the formation, borehole image information, and quantitative borehole fluid information in accordance with embodiments of the present disclosure. As described above, aspects of the present disclosure may include acquisition, interpretation, and application of quantitative fluid data, including Mud Gas Ratio hydrocarbon analysis. The profile 600 includes logging data comprising gamma ray log 602, rate of penetration (ROP) 604, a total gas log 606, a C1 log 608 (indicative of methane in the borehole fluid), a C1/C2 crossover log 610 (indicative of the ratio of methane to ethane in the borehole fluid), Pixler permeability log 612, and triangular permeability index log 614. Profile 600 includes near-field fracture parameters 616 derived from borehole image processing. Near-field fracture parameters may include location, orientation, and openess of fractures, density of groups of fractures, probabilities that individual fractures or groups of fractures are open, and so on. DSWI data includes side view DSWI amplitude logs 618, plan view DSWI amplitude logs 620 and a combined (side view and plan view) DSWI log 617.

Multiple parameters may be considered in combination. For example, triangular permeability values may be considered in combination with DSWI amplitudes. Parameters having values within a predefined range may be characterized as being associated with a particular state. High DSWI amplitudes indicate a high far-field fracture density, and high permeability values are indicative of high near-field fracture density, high formation fluid flow rates, and/or high connectivity. Each parameter may have associated therewith a set of characterizations and associated ranges of parameter values (e.g., as a configurations file). In embodiments, a heuristic resolving sets of parameter characterizations may be employed to estimate the absence or presence of a fracture or fracture set and the fracture characterization of the fracture or the fracture set collectively. Alternatively, sets of parameter characterizations may be correlated with the absence or presence of a fracture and the fracture characterization using associations in a data structure, such as a pointer or data record (e.g., as records in a lookup table or database). The characterizations may be associated directly using value ranges or through intermediate designations.

Referring again to FIG. 6, values for the parameters DSWI amplitude 617, 618, 620, total gas log 606, C1 log 608, and C1/C2 crossover log 610 (shown in the log data) are used to characterize the interval. In a first interval 691, these parameters are indicative of high critical stress (CS) fracture density, both near-field and far-field. Another interval 692 has parameter values indicative of high CS fracture density in the near field but low density in the far-field. Other intervals 693, 695 show high density in the far-field and moderate density in the near-field.

Aspects of the present disclosure may include carrying out stimulation or other completion operations in dependence upon parameters and models determined according to techniques described herein.

Figure 7:
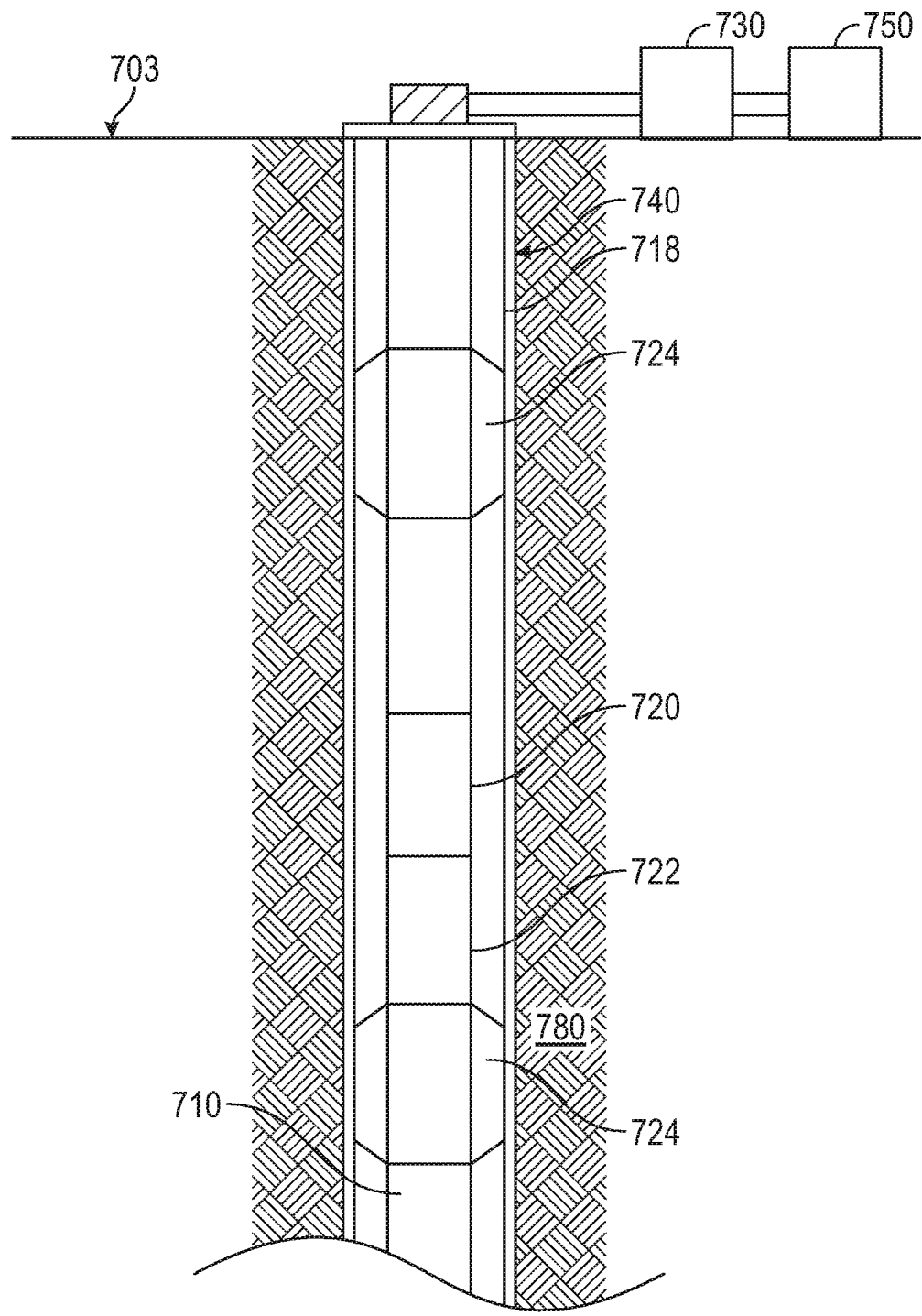
FIG. 7 illustrates a stimulation system in accordance with embodiments of the present disclosure.

FIG. 7 illustrates a stimulation system in accordance with embodiments of the present disclosure. The system 703 includes a downhole tool string 710, such as a stimulation string, wireline, or other carrier conveyed in a borehole 740 surrounded by casing 718. In one embodiment, the system 703 is configured as a hydraulic stimulation system, but system 703 may also be configured for additional functions such as hydrocarbon production, evaluation of the formation, evaluation of the borehole, and so on. As described herein, "stimulation" may include any injection of a fluid into a formation. An exemplary stimulation system may be configured as a cased or open hole system for initiating fractures and/or stimulating existing fractures in the formation.

The tool string 710 may include one or more tools or components to facilitate stimulation of the formation 780. For example, the tool string 710 may include a fracturing assembly 720 including, e.g., injection nozzles and mechanical valve devices (e.g., fracturing sleeves, drop-ball devices, and so on). The tool string 710 may include a perforation assembly 722. The tool string 710 may include additional components, such as one or more isolation components 724 (e.g., packer subs, frangible barriers, etc.). Subs may include one or more processors or associated electronics configured to communicate with a surface processing unit and/or control the respective component or assembly. The system 703 may be a hydraulic fracturing system that includes an injection device 730 (e.g., a high pressure pump) in fluid communication with a fluid source 750. The injection device 130 injects fluid into the string 710 to introduce fluid into the formation 780. Measurement and control devices, including one or more sensors responsive to pumping parameters, may be included for monitoring and control of the respective operation (e.g., hydraulic fracturing or other stimulation).

Methods include generating a borehole connectivity fracture model of the formation using the borehole image, the quantitative borehole fluid information, and the acoustic information, which may include determining a net post stimulation and completion stimulated rock volume (SRV), as well as the appropriate stimulation and completion geoengineered completion design. Methods embodiments may include conducting further operations in the earth formation in dependence upon the estimated parameter or upon models created using the estimated parameter. Further operations may include at least one of: i) extending the borehole; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) evaluating the formation; and x) producing one or more hydrocarbons from the formation.

Fracturing operations may be carried out to initiate hydrocarbon production or for purposes of well evaluation. Such operations may use example stimulation embodiments as discussed below. Hydraulic fracture may be produced in the formation by injection of a fracturing fluid in an injection borehole. Predicting propagation of the hydraulic fracture may be carried out using constraint analysis as described below.

The pressure required to initiate the fracture is a function of the magnitudes of the principal stresses, as well known in the art and embodied in "Compressive and tensile failure of inclined wellbores and determination of in-situ stress and rock strength" by Peska and Zoback (Peska, P., Zoback, M. D. Compressive and tensile failure of inclined wellbores and determination of in-situ stress and rock strength. J Geophys Res-Solid Earth 1995; 100:12791-811). The pressure required to extend the fracture away from the wellbore is controlled by the minimum horizontal stress. In another technique, the minimum horizontal stress is approximated with instantaneous shut-in pressure of a hydraulic fracture after pumping is ceased.

Propagation of the hydraulic fracture may be predicted by modeling the earth formation (e.g., using a three-dimensional geomechanical model) and using parameters of the principal stresses as an input. Stresses acting on the formation and fracture flow properties may be incorporated into a time-based (e.g., incremental) flow simulation. Alternatively, propagation may be predicted using a special purpose-built heuristic, using a neural network (with the principal direction of the far-field stress as one of the inputs), and so on. The predicted fracture may then be used alone or as part of a larger simulation (e.g., as a constraint) in planning further operations associated with the borehole or the formation. In some aspects, the hydraulic fracture may be predicted.

Predicting the propagation of the hydraulic fracture enables optimization of the fracture, along with optimization and project planning of other related future operations in the borehole, the formation, or related formations. Accurate propagation prediction enables proper orientation of horizontal laterals to minimize breakdown pressure, maximize fracture connectivity in the near-wellbore, and create an ideal geometry for maximum coverage of the intervals between wells by the hydraulic fracture and accompanying stimulated rock volume. See, for example, U.S. patent application publication No. 2016/030521 to Flores et al., U.S. patent application publication No. 2017/0247995 to Crew et al., U.S. Pat. No. 7,810,569 to Hill et al., and U.S. Pat. No. 9,920,607 to Brannon et al., each incorporated herein by reference in its entirety. See also R. D. Barree, A Practical Guide to Hydraulic Fracture Diagnostic Technologies, SPE Annual Technical Conference and Exhibition, 29 September-2 October (2002).

Figure 8:
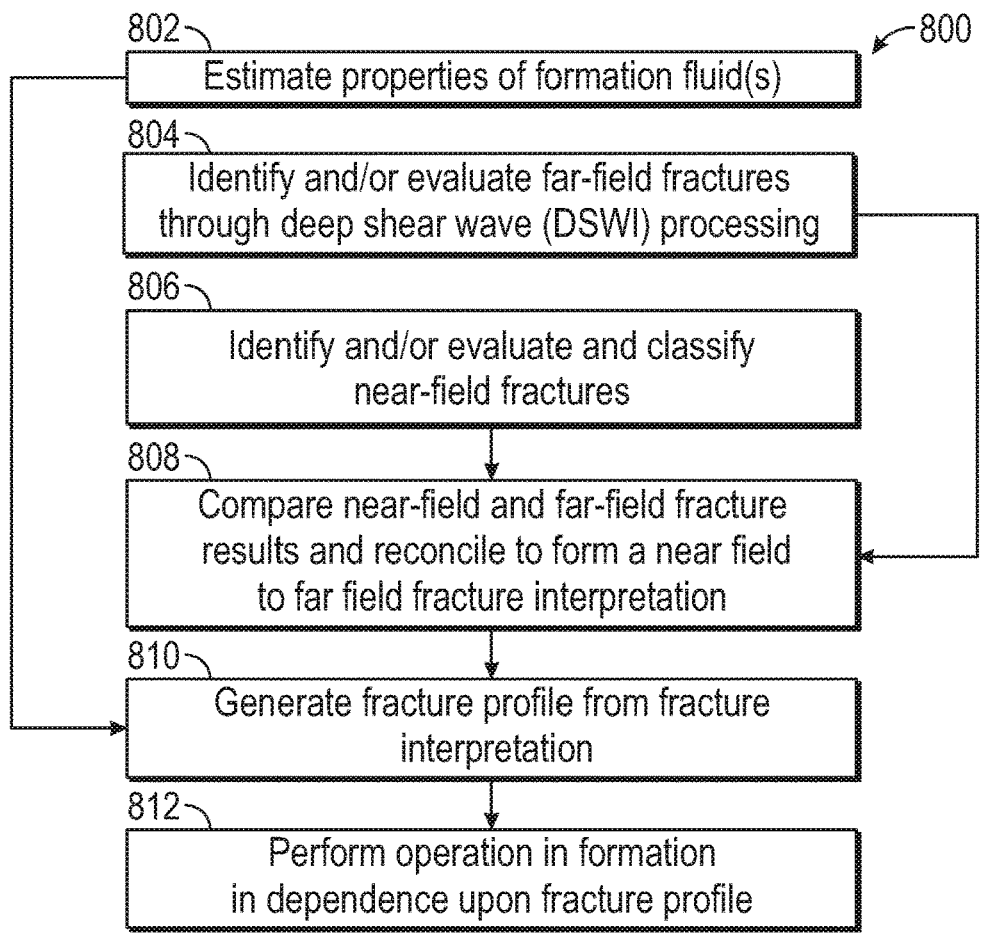
FIG. 8 illustrates a method of performing a downhole operation in accordance with embodiments of the present disclosure.

FIG. 8 illustrates a method 800 of performing a downhole operation in accordance with embodiments of the present disclosure. The method 800 may be utilized in conjunction with any suitable combination of sensing devices and at least one processor. In step 802, properties of formation fluids, flow properties of the formation, and so on may be estimated using acquired borehole fluid measurement data. Flow properties of the formation may be used to identify and characterize fractures. For example, fluid data is analyzed to estimate properties such as porosity and permeability, and chemical analysis is performed to determine the type of fluid to determine, e.g., whether fractures are water bearing or hydrocarbon bearing.

In step 804, far-field fractures are identified and classified from acquired acoustic measurement data. In step 806, near-field fractures are identified and classified from acquired borehole imaging data.

In step 804, acquired acoustic measurement (e.g., DSWI) data is analyzed to determine fracture properties in the far-field region of a formation around a borehole. Acquisition may be performed through a cased hole or an open hole. DSWI is performed by running an appropriate logging tool, as described above with reference to FIG. 1A, through a borehole and receiving reflected signals from reflective boundaries on the formation. In step 806, acquired borehole imaging data is analyzed to determine fracture properties in the near-field region of a formation around a borehole.

The DWSI data is analyzed to estimate characteristics of the formation, including identification of fractures and evaluation of properties of fractures in the far-field. In one embodiment, the data is analyzed to identify and evaluate critically stressed fractures, which can be most amenable to stimulation and production. For example, by processing the refection amplitude of reflected signals from reflective boundaries, various characteristics of the formation including fracture properties are estimated. In step 808, near-field and far-field fractures identified and characterized above are correlated to form a near-field to far-field fracture interpretation. This interpretation may first identify fractures in the near-field and far-field, and may also identify those fractures that are at least partially open.

In some embodiments, the degree of fracture "openness" may not be quantitatively determined at this stage. A fracture may therefore be classified as "open or "partially open" when a positive response is seen or as "closed" when the different measurements show no positive response to the fracture. In such embodiments, identification of at least partially open fractures may be employed as an index which can then be compared with dynamic data such as quantitative borehole fluid information (e.g., mud gas readings, etc.).

In step 810, a fracture profile is generated. The borehole fluid data and the fracture interpretation may be compared to evaluate the formation and determine the existence and extent of connectivity between the far-field fracture network and the borehole. For example, the DSWI data indicates the density of critically stressed fractures in the far-field, and the borehole fluid data indicates the amount of connectivity and may also indicate the types of fluids flowing through the fractures. Natural fractures and drilling induced fractures may have different geometrical distributions around the borehole, and so may be classified separately when interpreting borehole images. In some instances, far-field measurements may only be sensitive to "open"/"partially open" fractures (because "at least partially open" fractures provide much higher contrast then closed fractures). Thus, any fractures from a proposed fracture interpretation which are seen on the far-field measurement and intersect the borehole may be checked for a corresponding mud-gas response to confirm connectivity when gas is present in the formation. Fractures on the far-field measurement that do not intersect the borehole would not be expected to show a corresponding mud-gas response, and thus may be counter-indicative.

Petrophysical and geochemical consistency measures may be determined, indicating the connectivity consistency between one or more far-field fractures (and/or the surrounding volume) and near-field fractures. This may be carried out using quantitative fluid data. The connectivity consistency is a parameter whose value is representative of a likelihood that a near-field and far-field fracture have connectivity, as based on physical parameters (e.g., fracture properties) of each fracture which would be influenced by the connectivity, if present. As one example, mud gas measurements (e.g., mud gas ratios) may be linked according to depth with image-based near-field fracture position and orientation information. Measurements in agreement with a target range corresponding to the estimated fracture characteristics of a proposed correlated far-field fracture (or surpassing a threshold) may be indicative of connectivity. An algorithm may calculate a connectivity consistency value for the two candidate correlated partners based on one or more mud gas measurements. A heuristic for correlating open near-field and far-field fractures as connected may employ the connectivity consistency value for the pair along with position of each fracture, geological constraints, and so on. Alternatively, mudlogging data (e.g., total gas, C1/C2 ratio) may be input directly into a connectivity determination heuristic.

The fracture profile may be determined by generating a number of solutions, with each solution including a set of correlated fractures, measuring the group consistency of each set, and selecting the set with the highest group consistency as the optimal solution. Additional constraints may be added to the selection of the optimal solution based on geology, petrophysics, ground truth, other a priori information, and so on.

In step 812, an operation is performed in the formation in dependence upon the fracture profile. For example, stimulation and/or production operations may be planned based on the information derived from analysis of the acoustic and borehole imaging data in combination with the formation fluid measurement data. Operational parameters such as the type and/or amount of proppant, flow rate of stimulation fluid (e.g., hydraulic fracture fluid), and pump pressure of stimulation fluid may be selected. Other operational parameters can include identifying sections along the borehole that should be produced (e.g., sections having hydrocarbon bearing fractures and at least a threshold fracture density) and sections that should be avoided (e.g., sections having water bearing fractures or having low fracture extent or density).

Figure 9:
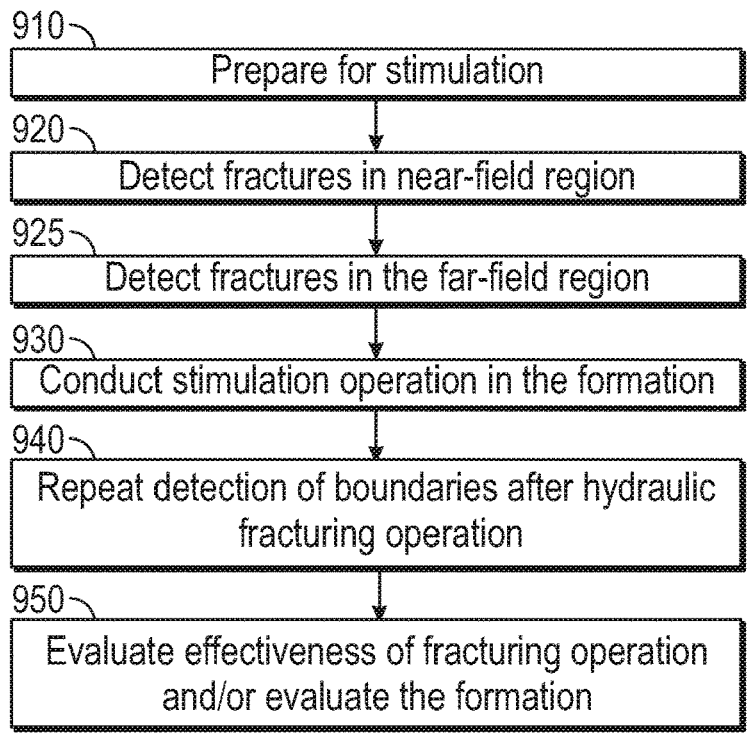
FIG. 9 illustrates a method for evaluating fractures in an earth formation.

FIG. 9 illustrates a method for evaluating fractures in an earth formation. The method 900 is described in conjunction with a processor that receives information (e.g., signal data) relating a fracturing operation. Optional step 910 may include preparation for stimulation. Step 910 may be carried out by selecting one or more zones of the borehole for stimulation, e.g., using various open hole logging operations. This may include, after identifying zones of interest, running casing into the borehole and cementing.

Optional step 920 of method 900 comprises detecting fractures in the near-field region. Step 920 may be carried out by processing the borehole image and/or by using quantitative borehole fluid information. Optional step 920 may include detecting natural fractures incident on the borehole.

Optional step 925 of method 900 comprises detecting fractures in the far-field region. This step may be carried out by obtaining acoustic information representative of acoustic reflections from a far-field region of the formation. Optional step 925 may be carried out by generating acoustic signals from a multipole source, e.g., a dipole source. Embodiments may include detection of the natural fractures performed through a cased hole. In other embodiments, detection is performed through an open hole, which may then be cased prior to the stimulation operation.

In some implementations, detection of fractures is performed as a logging tool is run through the cased hole. Detection of the reflector may be performed in the near-field in conjunction with another imaging technique, such as, for example, DSWI used for the far-field. In addition to detections, this information may be used to estimate the azimuth of the strike orientation of natural and hydraulic fractures from the wellbore. The amount of anisotropy (variation in a given direction) detected by the DSW imaging gives a measure of fracture intensity, and the azimuth gives the fracture strike direction.

Step 930 of method 900 may include conducting a stimulation operation in the formation. This may be carried out, for example, by using the system 703 to perforate the borehole and pump fluid into the borehole to hydraulically fracture the formation. Step 940 of method 900 repeats detection of boundaries after the hydraulic fracturing operation is complete. Optional step 950 may include evaluating the effectiveness of the fracturing operation and/or evaluate the formation, e.g., by modeling the formation or improving existing models. Post-fracture detection results may be compared with the pre-fracture detection results, for example. In addition, post-fracture imaging results may be compared with the pre-fracture imaging results. At least one of the post-fracture detection and post-fracture imaging is used to calculate the hydraulic fracture height (HFH) and length (HFL) and Stimulated Rock Volume (SRV).

By combining the combined near-field identification results with results from Deep Shear Wave Imaging (or other far-field imaging technique), the location, orientation and magnitude of fractures in the formation can be evaluated in both the far-field and near-field around the borehole. Additional measurements of reflected guided waves, compression waves, and Stoneley waves may also be used in combination with these measurements to provide a more complete picture of the fracture intensity and complexity before and after fracturing, and thus provides a more complete evaluation of the effectiveness of the fracturing operation. The measurements may be used to generate or improve a model of the formation and/or fractures, such as a discrete fracture network (DFN) model, geological model or other mathematical model of the formation. For example, images taken before and after the fracturing operation may be used to re-evaluate geomechanical properties of the formation and/or create new models.

In another embodiment, the strike orientation and azimuth estimated from the pre-fracturing and/or post-fracturing measurements are evaluated to estimate the number and extent of natural fractures and/or stimulated fractures. This information may be used to evaluate the effectiveness of the fracturing operation and/or make adjustments to subsequent fracturing operations.

Near-field boundary detection pre-and-post fracture results may be used in Fracture Stimulation Modeling and Design as part of the planning phase for wellbore completions. Such planning includes predicting hydraulic fracture height as well as fracture length and/or stimulated reservoir area away from the borehole.

Existing software typically uses models based on homogenous formations, but can apply heterogeneous model assumptions. Techniques of the present disclosure may be able to provide three critical parameters for a fracture model (HFH, HFL and SRA) that are the true response of the formation. This process removes at least some uncertainty caused by mathematical modeling assumptions and dramatically improves hydraulic fracturing stimulation solutions.

Aspects of the present disclosure may be implemented using techniques known in the art an adapted to use with near-field shear wave signals or with mixed near- and far-field signals. To that end, previous applications US 2015/0013974 to Mekic et al, US 2015/00109886 to Mekic et al, and US 2008/0151690 to Tang et al are hereby each incorporated by reference herein in their entirety.

Optional methods may include using the parameter of interest to estimate a characteristic of a formation. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Method embodiments may include conducting further operations in the earth formation in dependence upon formation information, estimated properties of the reflector(s), or upon models created using ones of these. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display. The borehole connectivity fracture model may associate connectivity between fractures and describe fractures with position information and other fracture parameters.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

Acoustic logs are records of the receipt, at successive borehole depth levels, of acoustic signals by receivers which are spaced along the length of a borehole tool from each other and from at least one transmitter of acoustic signals.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

As used herein, the term "fluid" and "fluids" refers to one or more gasses, one or more liquids, and mixtures thereof. A "downhole fluid" as used herein includes any gas, liquid, flowable solid and other materials having a fluid property and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, engineered fluids, oils and solvents used in conjunction with downhole tools, water, brine, and combinations thereof. An "engineered fluid" may be used herein to mean a human made fluid formulated for a particular purpose. The term "mud logging" refers to performing measurements and deriving information from any material found in borehole fluid. Mud logging may include data identifying fluid constituents, such as for example, gas logs, property data such as porosity and/or permeability logs, and the like. The term "geosteering" may refer to changing direction of the drill bit, stopping progression of the drill bit, or continuing advancement of the drill bit.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

Measurements of sonic travel time, or "slowness," are well known, and may be considered as depending upon the properties inherent in Snell's Law to propagate sound from a transmitter to a receiver through an earth formation. Slowness is the inverse of the sound velocity. The measurement is representative of travel time of sound through the formation. Typically the term refers to measurements wherein the transmitter and receiver are in a borehole intersecting the formation, e.g., on a tool string in the borehole. The speed of sound in the earth formation is governed in approximation by the physical properties embodied in the Wood-Biot-Gassmann equations. It is apparent that the values of slowness and velocity may be used interchangeably in the techniques disclosed herein. The parameters slowness and velocity are inversely related and the measurement of either may be converted to the other by simple mathematical relations that are well known in the art.

Thus, the term "slowness" as used herein may refer to slowness as traditionally understood, as well as other parametric equivalents.

"Closure pressure" as used herein refers to a parameter used in hydraulic fracture design to indicate the pressure at which the fracture effectively closes without proppant in place. "Profile" as used herein refers to a model. Parameters of interest may include lateral tectonic strain, minimum horizontal stress, and so on. "Substantially different" as used herein means not substantially the same. "Substantially the same," or "substantially similar" as used herein means a value consistent with a general formation structure, feature, or operating parameter, or having a value within a common statistical deviation, such as within one standard deviation, within 5 percent, within 1 percent of a moving average and so on. Substantially the same refers to values within the generally held value for common deviation, such as, for example, due to noise. The term "substantially the same" as applied in the context of signal characteristic refers to frequencies negating the effects of dispersion and attenuation, such that differences in effects between two signals having corresponding signal characteristics are negligible, such as, for example, differences in lateral beam field of less than 25 percent, less than 10 percent, less than 5 percent, less than 3 percent, less than 2 percent, less than 1 percent, less than 0.5 percent, and so on, down to and including no difference. The term "natural fracture" refers to fractures resulting from causes such as tectonic stresses (compression, extension, or trans-compression/trans-extension or shear). The term "man-made fracture" refers to a fracture resulting from system fluid pressures associated with hydrocarbon generation (e.g., catagenesis of kerogens through metagenesis of kerogens, bitumens and hydrocarbons), production, and other non-natural phenomena.

The estimated parameter of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements made in wireline or MWD applications may be done by a surface processor, by a downhole processor, or at a remote location. The data acquisition may be controlled at least in part by the downhole electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "substantially real-time" as applied to methods of the present disclosure refers to an action performed (e.g., estimation, modeling, and so on) while the sensor is still downhole, after the generation of the information and prior to movement of the sensor an appreciable distance within the context of evaluating the borehole or formation at an associated resolution, such as, for example, a distance of 100 meters, 50 meters, 25 meters, 10 meters, or less; and may be defined as estimation of the parameter of interest or production of the current iteration of a model within 15 minutes of generating the information, within 10 minutes of generation, within 5 minutes of generation, within 3 minutes of generation, within 2 minutes of generation, within 1 minute of generation, or less. The term "substantially continuous" as applied to measurement in accordance with embodiments of the present disclosure means that no gaps exist within the measurement corresponding to a circumference of the borehole at a particular borehole depth.

While the foregoing disclosure is directed to the one mode embodiments of the disclosure, various modifications will be apparent to those skilled in the art. It is intended that all variations be embraced by the foregoing disclosure.

What is claimed is:

1. A method of well logging using a logging tool in a borehole in an earth formation, the method comprising:
    conveying a logging tool in the borehole on a carrier;
    obtaining a borehole image over at least one interval of borehole depth from well logging measurements with a downhole imaging instrument;
    obtaining acoustic information representative of acoustic reflections from a far-field region of the formation;
    obtaining quantitative borehole fluid information indicative of properties of a formation fluid in a near-field region of the borehole, the quantitative borehole fluid information including a fluid content estimated from one or more measurements of the formation fluid;
    generating a borehole connectivity fracture model of the formation in dependence upon the borehole image, the quantitative borehole fluid information, and the acoustic information.

2. The method of claim 1, further comprising:
    identifying far-field fractures from the acoustic information;
    analyzing the fluid content in combination with the acoustic information, and determining a connectivity between a near-field fracture system and a far-field fracture system and one or more fractures in the far-field region based on the analyzing; and
    generating the borehole connectivity fracture model of the formation in dependence upon the identified far-field fractures and the determined connectivity.

3. The method of claim 1, further comprising:
    identifying near-field fractures from the borehole image; and
    generating the borehole connectivity fracture model of the formation in dependence upon the near-field fractures.

4. The method of claim 3, further comprising:
    identifying far-field fractures from the acoustic information;
    generating a fracture interpretation correlating the near-field fractures with the far-field fractures; and generating the borehole connectivity fracture model of the formation in dependence upon the fracture interpretation.

5. The method of claim 4, wherein generating the borehole connectivity fracture model of the formation in dependence upon the fracture interpretation comprises:
generating a plurality of fracture interpretations;
determining a connectivity consistency of each fracture interpretation of at least a portion of the plurality of fracture interpretations using the quantitative borehole fluid information; and
selecting the fracture interpretation in dependence upon the connectivity consistency.

6. The method of claim 4, wherein generating the borehole connectivity fracture model of the formation in dependence upon the fracture interpretation comprises:
generating a plurality of fracture interpretations;
determining a petrophysical consistency of each fracture interpretation of at least a portion of the plurality of fracture interpretations using the quantitative borehole fluid information; and
selecting the fracture interpretation in dependence upon the petrophysical consistency.

7. The method of claim 3, further comprising:
identifying near-field fractures at least partially open to the wellbore from the quantitative borehole fluid information, wherein the near-field fractures comprise at least some of the near-field fractures from the borehole image;
identifying far-field fractures from the acoustic information;
generating a fracture interpretation correlating the near-field fractures at least partially open to the wellbore with the far-field fractures; and
generating the borehole connectivity fracture model of the formation in dependence upon the fracture interpretation.

8. The method of claim 1, wherein identifying the near-field fractures at least partially open to the wellbore further comprises at least one of: i) identifying near-field fractures at least partially open to the wellbore from the quantitative borehole fluid information; and ii) identifying near-field fractures at least partially open to the wellbore using near-field acoustic data.

9. The method of claim 1, further comprising identifying a fracture with critical stress connectivity in dependence upon fluid content.

10. The method of claim 1, further comprising applying a completion treatment in dependence upon the borehole connectivity fracture model.

11. The method of claim 1, further comprising:
identifying position information comprising at least one of:
i) borehole depth, ii) azimuth, and iii) strike of at least one of the near-field fractures from the borehole image; and
generating the borehole connectivity fracture model of the formation in dependence upon the position information.

12. The method of claim 1, further comprising conducting further operations in dependence upon the borehole connectivity fracture model.

13. The method of claim 12, wherein the further operations comprise at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

14. The method of claim 1, wherein the borehole connectivity fracture model indicates a fracture connectivity between the far-field region and the near-field region, the fracture connectivity estimated based on at least the quantitative borehole fluid information.

15. The method of claim 14, wherein the quantitative borehole fluid information includes a quantitative measurement of an amount of one or more hydrocarbon gases in the borehole fluid.

16. The method of claim 15, wherein the borehole connectivity fracture model includes a density of critically stressed fractures in the far-field region and a degree of connectivity between a near-field fracture system and a far-field fracture system, the density estimated based on the acoustic information, and the degree of connectivity based on the quantitative measurement of the amount of the first hydrocarbon gas to the amount of the second hydrocarbon gas.

17. The method of claim 14, wherein the quantitative borehole fluid information includes a ratio of an amount of a first hydrocarbon gas to an amount of a second hydrocarbon gas.

* * * * *